United States Patent [19]

Natansohn et al.

[11] Patent Number: 5,173,381
[45] Date of Patent: Dec. 22, 1992

[54] AZO POLYMERS FOR REVERSIBLE OPTICAL STORAGE

[75] Inventors: Almeria L. Natansohn; Paul L. Rochon; Shuang Xie, all of Kingston, Canada

[73] Assignee: Queen's University, Kingston, Canada

[21] Appl. No.: 740,227

[22] Filed: Aug. 5, 1991

[51] Int. Cl.⁵ .................................................. G11B 7/24
[52] U.S. Cl. ........................................ 430/19; 430/21; 430/270; 430/495; 430/945; 365/113; 346/135.1
[58] Field of Search ................... 430/19, 21, 287, 270, 430/495, 945; 365/113; 346/135.1; 369/110, 275.2

[56] References Cited

U.S. PATENT DOCUMENTS 4,619,990  10/1986  Elmasry ............................. 534/573
5,023,859   6/1991  Eich et al. ........................... 365/113

OTHER PUBLICATIONS

Makromol Chem., 191 2133 (1990), Wiesner et al.
Makromol Chem., Rapid Commun. 12 81-87 (1991), Stumpe et al.
Nature vol. 351 49-50 May 1991, Gibbons et al.
Macromolecules 1990, 23, 42-48, Ikeda et al.
Makromol Chem., 192 215-221 (1991), Ikeda et al.
Applied Optics vol. 29 No. 4, 446-447 (1990), Ebralidze et al.
Makromol Chem., Rapid Commun. 10 477-483 (1989), Andesle et al.

Primary Examiner—Charles L. Bowers, Jr.
Assistant Examiner—John A. McPherson
Attorney, Agent, or Firm—Richard J. Hicks

[57] ABSTRACT

A novel series of azo polymers, copolymers and polymer blends for reversible optical storage devices are described. Various azobenzenes can be bound in the side chain or within the main chain of long chain polymers such as polyester, polystyrene and poly methacrylates with very short or no spacers to a form amorphous polymers which as a film or deposited on a transparent substrate can be used to record optical information using a linearly polarized laser beam which induces optical anisotropy in the film. The information can be erased thermally by heating above the glass transition temperature, or optically by overwriting with light polarized in a predefined zero direction or with circularly polarized light.

9 Claims, No Drawings

AZO POLYMERS FOR REVERSIBLE OPTICAL STORAGE

FIELD OF INVENTION

This invention relates to a process for the reversible optical storage of data using amorphous polymers containing aromatic azo groups bound in a side chain or within the main chain, and to a series of novel polymers. More particularly this invention relates to the production and use of polyacrylates and polymethacrylates containing substituted and unsubstituted azobenzenes.

BACKGROUND OF INVENTION

The possibility of using a polymer for reversible optical storage, holographic or digital, was first suggested in 1984, using an azo dye (methyl orange) dispersed into poly(vinyl alcohol). Since then Eich and Wendorff have demonstrated reversible optical storage properties on some liquid crystalline polymer films (U.S. Pat. Nos. 4,896,292; 4,886,718 and 4,837,745). One was a homopolymer containing a p-cyanoazobenzene bonded as a side chain in a polycarbonate through an oxygen atom and a spacer of six methylene groups. The spacer allowed the mesogenic azobenzene moiety to move about and organize into a liquid crystalline phase. The other film was an acrylic copolymer containing two types of mesogenic units: a p-cyanoazobenzene bonded through an oxygen and a spacer of six methylene groups and a p-cyanophenylbenzoate bonded in a similar way. The azobenzene moiety was ca. 30% of the structural units. When exposed to laser beams, these films stored the information written on them. The writing was done in the nematic or in the glassy phase (the glass temperature, Tg, is about 30° C.) and erasure could be achieved by heating the film above the clearing temperature. The mechanism postulated for the phenomenon was obviously related to the well-known trans-cis isomerization and was believed to involve a reorientation of the side groups brought about by the movement of the trans-cis isomerization. This explanation is very logical if a rotation mechanism is the main consideration in isomerization and a volume of ca. 0.25 $nm^3$ is required to accommodate the change. A more detailed investigation on the above copolymer showed that the polarized laser light turns the optical axis of the liquid crystalline polymer perpendicular to the polarization plane. The same writing phenomenon was observed in an amorphous copolymer (methylacrylate with 25 mol % azo component), except that in this case the writing beam was inducing the alignment (Anderle et. al. Mahromol. Chem. Rapid. Comm. 1989, 10, 477). The azo side chain was designed to include a long enough spacer in order to allow for reorientation. Thus, it appears that laser light induces a trans-cis isomerization accompanied by reorientation and that the reorientation is maintained even after all the cis-isomers revert to the more stable trans form. The same anisotropy can be induced by laser writing onto gelatin films doped with azo dyes (Ebradidze and Mumaladze Appl. Optics 1990, 29, 466).

Recently, a Japanese group has published two studies on similar copolymers, where the azo component is either a dopant in a liquid crystalline copolymer or a side chain comonomer (Macromolecules 1990, 23, 42 and Makromol Chem 1991, 192, 215). All polymers were liquid crystalline, but the spacers introduced to allow for liquid crystallinity were sometimes shorter (as low as 2 methylene groups). This produces polymers with higher glass transition temperatures, and the laser writing is performed in the nematic phase or in the glassy state.

A further significant development in the field, appeared in Nature 1991, 351, 49 where it was reported that induction of orientation can be obtained with a polarized laser or just by rubbing the polymer film in a certain direction. This orientation can be transmitted to a liquid crystalline material adjacent to the oriented film. The film employed in this reference was a polyimide doped with a diazo dye. At about the same time, Stumpe et al (Makromol Chem Rapid Commun 1991, 12, 81) synthesized a methacrylate copolymer with 14 mol % azobenzene side chains and with a Tg of 60° C., significantly higher than any of the previous polymers. They demonstrated that writing can be performed in the glassy state, and that the reorientation of the azobenzene moieties actually affects the neighbouring mesogenic groups, probably by the same mechanism as described in the Nature article. To erase the writing on that copolymer heating above the clearing temperature (84° C.) was necessary. The conclusions that can be drawn from all these studies is that writing with a polarized laser onto a polymer film is being performed by a trans-cis isomerization accompanied by reorientation, and that the reorientation, perpendicular to the laser polarization is being maintained even after the cis-trans isomerization, which occurs spontaneously with a time constant of about 4 hours at room temperature (Wiesner et. al. Makromol Chem. 1990, 191, 2133). This reorientation is transmitted to the neighbouring mesogenic units which are not photosensitive. The writing is permanent (a 2 year stability was reported for a hologram at room temperature) unless heating above the glass transition temperature, or above the clearing temperature is performed. The liquid crystalline nature of the polymers involved helps in allowing enough flexibility for the azo side group to reorient after the isomerization. On the other hand, spacers long enough to allow movement decrease the glass transition temperature of the film, and probably increases the rate of relaxation at room temperature. In principle, the higher the Tg of the polymer, the greater the stability of the writing at room temperature (well below Tg).

There is great interest in optical storage media which in addition to high recording densities are also capable of reversible storage. However, the polymer liquid crystals for use in such storage media described above are relatively costly to produce and have certain critical operating parameters. There is, therefore a need for improved polymers which do not rely on the liquid crystal phenomenon for use in optical data storage media, which can be written on and erased in a much simpler way, and which are simpler and cheaper to produce.

OBJECT OF INVENTION

It is, therefore, an object of the present invention to provide novel amorphous polymeric materials for use in reversible optical information storage devices.

Another object of the invention is to provide a process for making the novel amorphous polymeric materials.

Yet another object is to provide a device for reversible optical information storage in which information can be repeatedly stored and more simply read without decomposition of the device.

BRIEF STATEMENT OF INVENTION

Thus by one aspect of this invention there is provided:

A monomer for binding in a polymeric side chain so as to produce an amorphous polymer for reversible optical information storage, said monomer having a general formula:

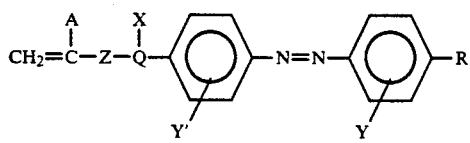

where

A is selected from hydrogen, alkyl having 1-6 carbon atoms, and chlorine

R is selected from $NO_2$ $S(CH_2)_pH$ where $p=1-4$ $NR_1R_2$ where $R_1,R_2$ are alkyl having 1-4 carbon atoms or $-(CH_2)_pOH$ where p is 1-4

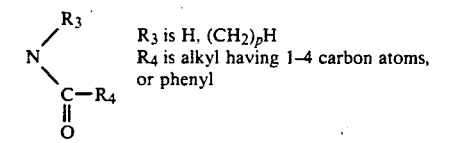 $R_3$ is H, $(CH_2)_pH$
$R_4$ is alkyl having 1-4 carbon atoms, or phenyl

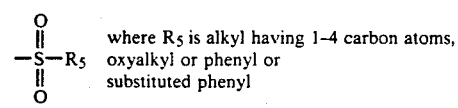 where $R_5$ is alkyl having 1-4 carbon atoms, oxyalkyl or phenyl or substituted phenyl

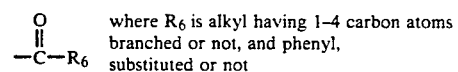 where $R_6$ is alkyl having 1-4 carbon atoms branched or not, and phenyl, substituted or not Q is selected from N, O and S.

X is selected from hydrogen and alkyl having 1-6 carbon atoms

Y & Y' are the same or different and selected from H halogen and methoxy and Z is selected from carbonyl, oxycarbonyl and alkyloxy carbonyl.

By another aspect of this invention there is provided a process for reversible optical information storage utilizing a device comprising a film comprising an amorphous polymer having the general formula

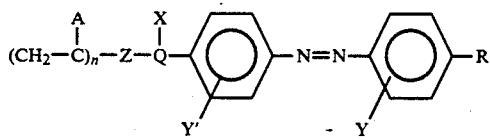

where

A is selected from hydrogen, alkyl having 1-6 carbon atoms and chlorine

R is selected from $NO_2$ $S(CH_2)_pH$ where $p=1-4$ $NR_1R_2$ where $R_1,R_2$ are alkyl having 1-4 carbon atoms or $-(CH_2)_pOH$ where p is 1-4

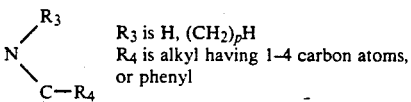 $R_3$ is H, $(CH_2)_pH$
$R_4$ is alkyl having 1-4 carbon atoms, or phenyl

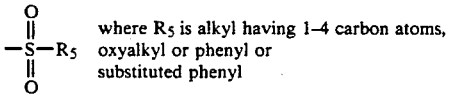 where $R_5$ is alkyl having 1-4 carbon atoms, oxyalkyl or phenyl or substituted phenyl

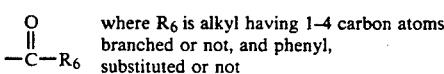 where $R_6$ is alkyl having 1-4 carbon atoms branched or not, and phenyl, substituted or not Q is selected from N, O and S.

X is selected from hydrogen and alkyl having 1-6 carbon atoms

Y & Y' are the same or different and selected from H halogen and methoxy and Z is selected from carbonyl, oxycarbonyl and alkyloxy carbonyl.

comprising the steps of:
(a) recording information below the glass temperature of said polymer by locally reorienting said polymer by linearly polarized light, and
(b) reading stored information by illuminating said polymer with polarized light.

DETAILED DESCRIPTION OF THE PREFERRED EMBODIMENTS

It has now been discovered that amorphous polymers, based on Disperse Red, an azo-dye, and other polymers containing azo groups bound in a side chain or within the main chain and containing very short spacers can be synthesized with relatively high glass transition temperatures (Tg). This results in a significant increase in the stability of the written material.

Polymers, copolymers and polymer blends of the present invention may be based on many conventional polymer chains including polyacrylates and polymethacrylates, polystyrene, polyamides, polyethylene, polyurethanes and polyesters and the azoaromatic groups to be incorporated therein, either in the main chain or in a side chain and may be selected from compounds having the following general formula.

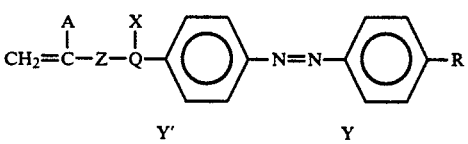

where

A is selected from hydrogen; an alkyl group having 1-6 carbon atoms and chlorine.

R is selected from $NO_2$

S(CH₂)ₚH where p=1-4
NR₁R₂ where R₁,R₂ are alkyl having 1-4 carbon atoms or —(CH₂)ₚOH where p is 1-4

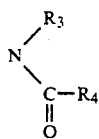
R₃ is H, (CH₂)ₚH
R₄ is alkyl having 1-4 carbon atoms, or phenyl where R₅ is alkyl having 1-4 carbon atoms, oxyalkyl or phenyl or substituted phenyl

where R₆ is alkyl having 1-4 carbon atoms branched or not, and phenyl, substituted or not Q is selected from N,O and S.
X is selected from H and alkyl containing 1-6 carbon atoms.
Y and Y' are the same or different and selected from H halogen or methoxy.
and Z is selected from carbonyl, oxycarbonyl and alkyloxycarbonyl.

Preferred monomers within the above general formula include:

(a) 4'-(2 Acryloxyethyl) ethyl amino-4-nitroazobenzene (Tg of the polymer=91° C.)

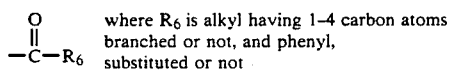

(b) 4'-(2-methacryloxyethyl) ethyl amino-4- nitroazobenzene (Tg of the polymer=129° C.)

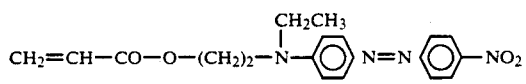

(c) 4'-(2-acryloxyethyl) ethyl amino-3-chloro-4 nitroazobenzene (Tg of the polymer=87° C.)

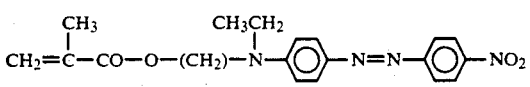

and
(d) 4' acryloxyamino-4 nitroazobenzene (Tg of the polymer>180° C.)

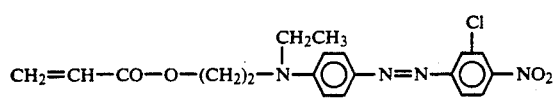

The amorphous polymer may be used in the form of a thin film or layer as a coating on a solid or flexible matrix substrate or it may be used as a freely standing film.

PRODUCTION OF MONOMERS

Example 1

4'-(2-Acryloxyethyl)ethylamino-4-Nitroazobenzene

A mixture of 4'(2-hydroxyethyl)ethylamino-4-nitroazobenzene (Aldrich, disperse red 1) 10 g (0.032 mol), triethylamine (BDH) 6 g (0.06 mol) and dry tetrahydrofuran (THF) 50 ml was cooled in an ice bath with mechanical stirring. Acryloyl chloride (Aldrich, freshly distilled) 4 g (0.044 mol) in tetrahydrofuran (THF) 20 ml was added dropwise to the mixture. The reaction mixture was stirred at 0° C. for 1 hour and then at room temperature for 6 hours. The precipitated amine salt was removed from the solution by vacuum filtration. The filtrate was concentrated using a rotovap. The concentrated THF solution was then poured into ice water, the precipitate was filtrated and washed with water. The product was dried and recrystallized in ethanol (Yield 60%). ¹H NMR (CDCl₃) 1.30 (—CH₃), 3.56 (—CH₂—ethyl), 3.75 (N—CH₂—), 4.40 (—CH₂—O—), 6.15 (—CH=CH₂), 6.82 (2 aromatic H, ortho to N), 7.91 (4 aromatic H, ortho to N=N), 8.33 (2 aromatic H, ortho to NO₂).

Example 2

4'-(2-Methacryloxyethyl)ethylamino-4-nitroazobenene

The same procedure as in Example 1 was used to synthesize this monomer using methacryloyl chloride (Aldrich, freshly distilled) 4.78 g (0.048 mol) instead of acryloyl. ¹H NMR (CDCl₃) 1.28 (—CH₃ ethyl, 1.51 (—CH₃, α-methyl), 3.55 (—CH₂—, ethyl), 3.69 (N—CH₂—), 4.36 (—CH₂—O—), 5.82 (—C=CH₂), 6.92 (2 aromatic H, ortho to N), 7.90 (4 aromatic H, ortho to N=N), 8.30 (2 aromatic H, ortho to NO₂).

Example 3

4'-Acryloxyamino-4-Nitroazobenzene

The same procedure as in Example 1 was used to synthesize this monomer using 4'-amino-4-nitroazobenzene (Aldrich, disperse orange 3) 10 g (0.041 mol), acryloyl chloride 3.75 g (0.041 mol), triethylamine 4.55 g (0.045 mol). ¹H NMR (CDCl₃) 6.20 (—CH=CH₂), 7.80 (2 aromatic H, ortho to N), 8.00 (4 aromatic H, ortho to N=N), 8.37 (2 aromatic H, ortho to NO₂).

Example 4

4'-(2-Acryloxyethyl)ethylamino-3-chloro-4-Nitroazobenzene

The same procedure as in Example 1 was used to synthesize this monomer using 4'-(2-hydroxyethyl)ethylamino-3-chloro-4-nitroazobenzene (Aldrich, disperse red 13) 10 g (0.0287 mol). ¹H NMR (CDCl₃) 1.38 (—CH₃), 3.54 (—CH₂—, ethyl), 3.72 (N—CH₂—), 4.39 (—CH₂—O—), 6.20 (—CH=CH₂), 6.84 (2 aromatic H, ortho to N), 7.79 (4 aromatic H, ortho to N=N), 8.18 (1 aromatic H, ortho to NO₂), 8.41 (1 aromatic H, ortho to NO₂).

PRODUCTION OF POLYMER

Example 5

4'(-2-Acryloxyethyl)ethylamino-4-nitroazobenzene 2 g was dissolved in dry toluene (20 ml) in an ampoule. 10% of the monomer weight of initiator AIBN was added. The ampoule was purged using nitrogen and sealed. The ampoule was then kept at 60° C. for 4 days.

The resulting polymer mixture was precipitated in methanol (500 ml). The precipitate was filtrated and dried. The polymer was dissolved in THF and re-precipitated in methanol. After drying under vacuum, the polymer yield was 50%.

The same method was used for the polymerization of 4'-(2-methacryloxyethyl)ethylamino-4-nitroazobenzene, 4'-acryloxyamino-4-nitroazobenzene, and 4'-(2-acryloxyethyl)ethylamino-3-chloro-4-nitroazobenzene.

Example 6

The same procedure as described in Example 5 was employed except that a 1:1 mol composition of the azo monomer and methyl methacrylate were used in the initial copolymerization mixture. The result of the polymerization was a copolymer containing the active structural unit (the azo group) and a "neutral" structural unit (in this example, methyl methacrylate).

Copolymers with a variety of neutral comonomers and containing the active structural unit in molar proportions between 1 and 100% were obtained.

Example 7

The active polymer of Example 5 or 6 was mixed with poly(methyl methacrylate) (both as solutions in tetrahydrofuran) in a weight ratio of 1:1, the solvent was then allowed to evaporate at room temperature and the solid sample briefly heated at ca. 100° C. to eliminate any residual solvent. A transparent film was obtained.

Blends with a variety of "neutral" polymers and containing the active polymer in molar proportions between 1 and 100% were obtained and checked for their writing properties. The main condition is that the two polymers being mixed be compatible at a level of ca. 1000 Å or so as to form a transparent film.

OPTICAL IMAGE RECORDING

A thin film 100-1000 nm and preferably about 500 nm is deposited on a transparent substrate, such as a glass sheet. Recording of optical information is achieved using linearly polarized light which induces optical anisotropy in the polymer film. The information or image is written by illuminating the film with linearly polarized light which is absorbed by the azo molecule in the film. A substantial number of the polarizable molecules subsequently align themselves in a direction which is perpendicular to the writing electric field direction. This preferential alignment of the molecules appears to be stable over the long term and results in a local anistropy in the optical properties of the film, in particular dichroism and birefringence can be observed.

Information can be recorded in a number of polarization directions which can then be detected using a variety of optical set-ups. It is possible to read the information using holographic techniques or, more frequently, by monitoring the light transmitted through a crossed polarizer set-up. In the later case three states of polarization can be readily separated: linearly polarized horizontal or vertical, linearly polarized at +/−45 degrees, no polarization.

For a thin film of about 500 nanometers thick on a glass substrate the optical writing and erasing times are one or two seconds to achieve 90% of saturation when using a argon laser at 514 nm at a power of 5 milliwatts in a one millimeter diameter beam. A difference of at least 5% in the transmission through the film for light which is polarized parallel to light which is polarized perpendicular to the writing beam has been measured. The transmission is smaller in the latter case.

It is also possible to write a grating on the film with a line separation of about one micron. This indicates that the resolution limit of the recording is established by the optics rather than the recording medium.

It will be appreciated that while it is often desirable to deposit the polymers onto a transparent substrate, such as glass, because of the fragile nature thereof some of the materials of the present invention, and in particular the polymer blends, are extremely strong and ductile so that they may be used without a substrate.

OPTICAL IMAGE ERASURE

The optical information can be erased from the film either thermally or optically. The molecules can be made to adopt a random orientation by heating the film above the glass transition temperature (Tg) of the film. The information can be changed at lower temperatures by overwriting with light which is polarized in a predefined "zero" direction or with circularly polarized light. The latter technique effectively randomizes the molecular orientations. The latter techniques also allows local, selective erasure, while heating erases the whole film.

The writing procedure, in effect, orients polarizable groups, which is exactly what is usually done by electrical field poling to obtain non-linear optical properties of polymerizable materials. Thus, the method described herein is a very simple and convenient method of poling to obtain submicron waveguides, and the polymers herein have potential non-linear optical properties and can be used as optical waveguides and sensors. It will be appreciated that these properties indicate that the present material may also be used as holographic storage materials digital storage materials, random access memories for optical computers, and digital tape.

We claim:

1. A process for reversible optical information storage utilizing a device comprising an amorphous film of a polymer, copolymer or polymer blend incorporating, in a main chain or a side chain thereof, an azoaromatic compound having the general formula:

$$CH_2=\overset{A}{\underset{|}{C}}-Z-\overset{X}{\underset{|}{Q}}-\!\!\langle\bigcirc\rangle\!\!-N\!=\!N\!-\!\!\langle\bigcirc\rangle\!\!-R$$

where
 A is selected from hydrogen and methyl,
 R is selected from

NO$_2$

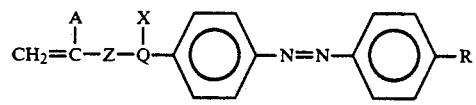
—S—R$_5$ where R$_5$ is alkyl having 1–4 carbon atoms, oxyalkyl or phenyl or substituted phenyl

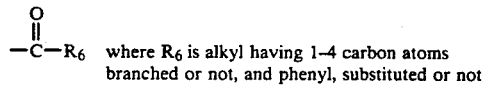
—C—R$_6$ where R$_6$ is alkyl having 1–4 carbon atoms branched or not, and phenyl, substituted or not Q is selected from N, O and S,
X is selected from hydrogen and alkyl having 1–6 carbon atoms and Z is selected from carbonyl, oxycarbonyl and alkyloxy carbonyl, comprising the steps of:
(a) recording information below the glass temperature of said polymer by locally reorienting said polymer by linearly polarized light,
(b) reading stored information, and
(c) erasing said stored information by overwriting with light selected from light polarized in a selected zero direction and circularly polarized light.

2. A process as claimed in claim 1 including the step of erasing said stored information by heating said polymer to a temperature above the glass transition temperature.

3. A process as claimed in claim 1 wherein said stored information is read by illuminating said polymer with polarized light.

4. A process as claimed in claim 1 wherein said stored information is read by a holographic technique.

5. A process as claimed in claim 1 wherein said film is an amorphous copolymer of said azoaromatic compound and a second monomer, containing between 1% and 100% azo monomer units.

6. A process as claimed in claim 1 wherein said film comprises a polymer blend obtained by mixing a polymer containing said azoaromatic compound with a second polymer.

7. A process as claimed in claim 5 wherein said second monomer is methyl methacrylate.

8. A process as claimed in claim 6 wherein said second polymer is selected from poly(methyl methacrylate), polycarbonate and polystyrene.

9. A process as claimed in claim 1 wherein said amorphous film comprises a polymer polymerized from said azoaromatic compound.

* * * * *